Oct. 18, 1932.    W. E. GRIMM    1,883,721
WINDSHIELD CONSTRUCTION
Filed May 28, 1929
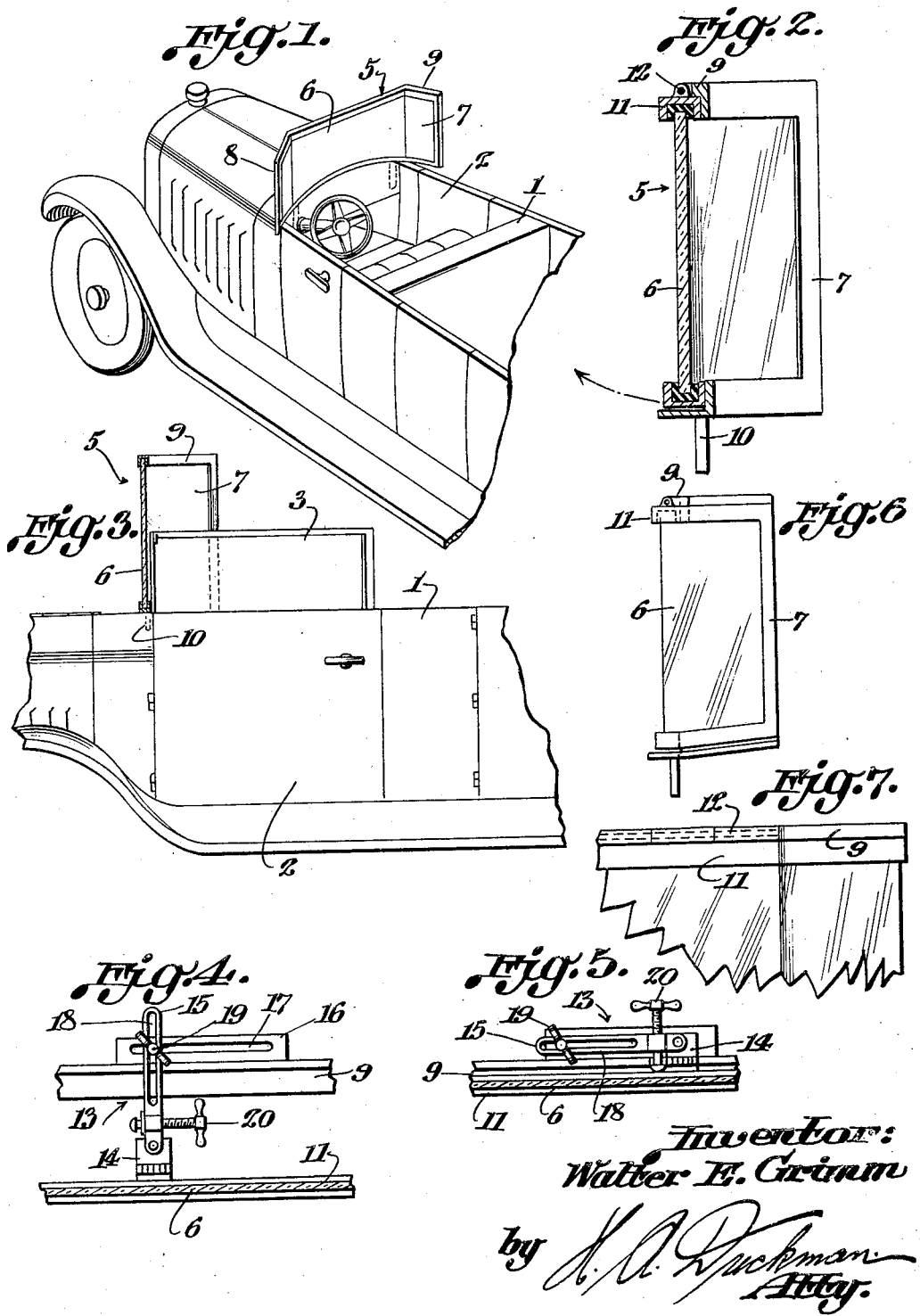

Patented Oct. 18, 1932

1,883,721

UNITED STATES PATENT OFFICE

WALTER E. GRIMM, OF LONG BEACH, CALIFORNIA

WINDSHIELD CONSTRUCTION

Application filed May 28, 1929. Serial No. 366,614.

This invention relates to a windshield construction and the prime object of my invention is to provide a windshield for motor vehicles in which a greater range of unobstructed vision is provided for the driver than in windshield constructions heretofore in use.

Another object is to provide a windshield in which the main portion and the wings are integral.

Still another object is to provide a novel means of ventilating the vehicle by swinging the entire shield construction.

Other objects, advantages, and features of invention may appear from the accompanying drawing, the subjoined detailed description, and the appended claims.

In the drawing

Figure 1 is a fragmentary perspective view of a vehicle with my windshield mounted thereon.

Figure 2 is a transverse sectional view of the windshield.

Figure 3 is a fragmentary side elevation of a vehicle with my windshield mounted thereon, the windshield being shown in section.

Figure 4 is a fragmentary plan view of the shield adjusting means in open position.

Figure 5 is a plan view of the same in closed position.

Figure 6 is a side view of my windshield.

Figure 7 is an enlarged fragmentary front view of the upper part of the windshield.

Referring more particularly to the drawing, the numeral 1 indicates a vehicle which is provided with the usual doors 2, 2, said doors being preferably hinged at the front edge thereof. In closed vehicles an adjustable glass section 3 rises from the doors, said section being preferably enclosed by a thin bead 4. My windshield 5 is mounted in the usual position on the vehicle 1 and consists of a central main section 6 which is preferably not curved and two integrally formed wing sections 7, 8. The glass which forms the main section and the two wings is formed in one piece.

An angle frame 9 extends entirely around the windshield and a pair of posts 10, 10 depend from the frame 9 and extend into the body of the vehicle, thus holding the windshield in position. A channel frame 11 extends entirely around the glass sections 6, 7, 8, and fits closely in the angle frame 9. A hinge 12 extends across the top of the straight section 6 and thus hingedly secures the frame 11 to the frame 9. It will be seen that the entire windshield structure within the frame 11 can be tilted outwardly from the bottom, thus ventilating the vehicle as desired.

The windshield may be held in an outwardly tilted position by means of the adjustable latch 13. This latch includes a plate 14 secured to the frame 11 and an arm 15 which is preferably secured to the plate 14 and extends rearwardly therefrom. A second plate 16 is secured to the frame 9 and is provided with a slot 17 which slot is parallel to the frame 9. The arm 15 is provided with a slot 18 therein and a bolt 19 extends through the two slots 17, 18 and adjustably holds the arm 15 in position.

When the windshield is closed the arm 15 is parallel to the plate 16 and is clamped in this position by the bolt 19. A threaded pin 20 extends through the arm 15 and when the windshield is in closed position this pin is threaded into contact with the frame of the windshield to prevent rattling thereof. As shown in Figure 3 the forward edge of the glass panel 3 is positioned very close or in contact with the windshield. This will prevent any air from passing between the windshield and the sliding glass panel 3.

It will be seen that there are no corner posts or other obstructions which will obstruct the vision of the driver anywhere throughout the entire width of the central section 6 and the two wings 7, 8. The frame 9 which extends around the windshield and particularly the rear vehicle sections thereof are far enough to the rear so that they will not hinder the driver.

Having described my invention, I claim:

1. A vehicle windshield construction comprising a main section, wings on the sides of said main section, said main section and wings being integrally formed, a frame extending around said main section and wing sections, means whereby said frame is secured to the vehicle, a second frame surrounding the main and wing sections, said second frame being adapted to fit into the first named frame, a hinge connecting said first and last named frames whereby the windshield construction may be swung outwardly from the bottom.

2. A vehicle windshield construction comprising a main glass section, wing sections on both sides of the main glass section, all of said sections being integrally formed, a frame extending around said main and wing sections, posts depending from said frame and adapted to extend into the body of the vehicle whereby the windshield is secured in position, a second frame surrounding said main and wing sections, said second frame being adapted to fit into the first named frame, and a hinge connecting said first and last named frames, said hinge being positioned at the top of the last named frame whereby the windshield construction may be swung outwardly from the bottom.

In testimony whereof, I affix my signature.

WALTER E. GRIMM.